(12) United States Patent
Kim et al.

(10) Patent No.: US 10,383,010 B2
(45) Date of Patent: Aug. 13, 2019

(54) METHOD AND APPARATUS FOR PERFORMING SERVICE DISCOVERY IN WIRELESS COMMUNICATION SYSTEM

(71) Applicant: LG ELECTRONICS INC., Seoul (KR)

(72) Inventors: Dongcheol Kim, Seoul (KR); Giwon Park, Seoul (KR); Byungjoo Lee, Seoul (KR); Hyunhee Park, Seoul (KR); Taesung Lim, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 15/566,948

(22) PCT Filed: Apr. 18, 2016

(86) PCT No.: PCT/KR2016/003987
§ 371 (c)(1),
(2) Date: Oct. 16, 2017

(87) PCT Pub. No.: WO2016/167618
PCT Pub. Date: Oct. 20, 2016

(65) Prior Publication Data
US 2018/0124654 A1 May 3, 2018

Related U.S. Application Data

(60) Provisional application No. 62/148,762, filed on Apr. 17, 2015.

(51) Int. Cl.
*H04W 4/00* (2018.01)
*H04W 36/00* (2009.01)
(Continued)

(52) U.S. Cl.
CPC ......... *H04W 36/0027* (2013.01); *H04L 29/08* (2013.01); *H04L 67/1068* (2013.01);
(Continued)

(58) Field of Classification Search
CPC ..... H04L 29/08; H04L 67/1068; H04L 67/16; H04W 36/00; H04W 36/0027;
(Continued)

(56) References Cited

U.S. PATENT DOCUMENTS

2013/0196595 A1  8/2013  Byrne et al.
2014/0351445 A1  11/2014  Davidson et al.
(Continued)

FOREIGN PATENT DOCUMENTS

WO  WO 2014/025218 A1  2/2014
WO  WO 2014/123383 A1  2/2014
WO  WO 2014/042427 A1  3/2014

*Primary Examiner* — Minh Trang T Nguyen
(74) *Attorney, Agent, or Firm* — Birch, Stewart, Kolasch & Birch, LLP

(57) ABSTRACT

The present invention relates to a method for performing, by a first terminal, service discovery in a wireless communication system. The method for performing service discovery comprises the steps of: transmitting a handover request message to a second terminal by using near field communication (NFC); and receiving a handover selection message from the second terminal by using NFC, wherein the handover selection message may include information on a P2P connection and formation of an ASP session.

11 Claims, 13 Drawing Sheets

(51) Int. Cl.

| | |
|---|---|
| *H04L 29/08* | (2006.01) |
| *H04W 4/80* | (2018.01) |
| *H04W 48/08* | (2009.01) |
| *H04W 48/16* | (2009.01) |
| *H04W 8/00* | (2009.01) |
| *H04W 48/14* | (2009.01) |
| *H04W 76/14* | (2018.01) |
| *H04W 84/12* | (2009.01) |
| *H04W 84/18* | (2009.01) |

(52) U.S. Cl.
CPC ............... *H04L 67/16* (2013.01); *H04W 4/00* (2013.01); *H04W 4/80* (2018.02); *H04W 8/005* (2013.01); *H04W 36/03* (2018.08); *H04W 48/08* (2013.01); *H04W 48/14* (2013.01); *H04W 48/16* (2013.01); *H04W 76/14* (2018.02); *H04W 84/12* (2013.01); *H04W 84/18* (2013.01)

(58) Field of Classification Search
CPC ..... H04W 48/08; H04W 48/14; H04W 48/16; H04W 4/00; H04W 4/80; H04W 76/14; H04W 8/00; H04W 8/005
See application file for complete search history.

(56) References Cited

U.S. PATENT DOCUMENTS

| | | | |
|---|---|---|---|
| 2015/0099512 A1* | 4/2015 | Amano | H04W 36/14 455/426.1 |
| 2015/0257188 A1* | 9/2015 | Patil | H04W 4/08 455/41.1 |
| 2016/0050551 A1* | 2/2016 | Qi | H04W 48/10 455/434 |

* cited by examiner first WFD device (cellular phone)     second WFD device (display device)

METHOD AND APPARATUS FOR PERFORMING SERVICE DISCOVERY IN WIRELESS COMMUNICATION SYSTEM

CROSS REFERENCE TO RELATED APPLICATIONS

This application is the National Phase of PCT International Application No. PCT/KR2016/003987, filed on Apr. 18, 2016, which claims priority under 35 U.S.C. 119(e) to U.S. Provisional Application No. 62/148,762, filed on Apr. 17, 2015, all of which are hereby expressly incorporated by reference into the present application.

TECHNICAL FIELD

The present invention relates to a wireless communication system, and more particularly, to a method and apparatus for performing service discovery in a wireless communication system.

BACKGROUND ART

Wireless access systems have been widely deployed to provide various types of communication services such as voice or data. In general, a wireless access system is a multiple access system that may support communication of multiple users by sharing available system resources (e.g., a bandwidth, transmission power, etc.). For example, multiple access systems include a Code Division Multiple Access (CDMA) system, a Frequency Division Multiple Access (FDMA) system, a Time Division Multiple Access (TDMA) system, an Orthogonal Frequency Division Multiple Access (OFDMA) system, a Single Carrier Frequency Division Multiple Access (SC-FDMA) system, and a multi carrier frequency division multiple access (MC-FDMA) system.

Recently, various wireless communication technologies have been developed with the advancement of information communication technology. Among the wireless communication technologies, a wireless local area network (WLAN) is the technology capable of accessing the Internet by wireless in a home, a company or a specific service provided area through portable device such as a personal digital assistant (PDA), a laptop computer, a portable multimedia player (PMP), etc. based on a radio frequency technology.

A standard for a WLAN (wireless local area network) technology is developing by IEEE (institute of electrical and electronics engineers) 802.11 group. IEEE 802.11a and b use an unlicensed band on 2.4 GHz or 5 GHz, IEEE 802.11b provides transmission speed of 11 Mbps and IEEE 802.11a provides transmission speed of 54 Mbps. IEEE 802.11g provides transmission speed of 54 Mbps by applying OFDM (orthogonal frequency division multiplexing) on 2.4 GHz. IEEE 802.11n provides transmission speed of 300 Mbps by applying MIMO-OFDM (multiple input multiple output-orthogonal frequency division multiplexing). IEEE 802.11n supports a channel bandwidth up to 40 MHz. In this case, transmission speed can be provided as fast as 600 Mbps. IEEE 802.11p corresponds to a standard for supporting WAVE (wireless access in vehicular environments). For instance, 802.11p provides improvement necessary for supporting ITS (intelligent transportation systems). IEEE 802.11ai corresponds to a standard for supporting fast initial link setup of IEEE 802.11 station.

A DLS (direct link setup)-related protocol in wireless LAN environment according to IEEE 802.11e is used on the premise of a QBSS (quality BSS) supporting QoS (quality of service) supported by a BSS (basic service set). In the QBSS, not only a non-AP STA but also an AP corresponds to a QAP (quality AP) supporting QoS. Yet, in current commercialized wireless LAN environment (e.g., wireless LAN environment according to IEEE 802.11a/b/g etc.), although a non-AP STA corresponds to a QSTA (quality STA) supporting QoS, most of APs corresponds to a legacy AP incapable of supporting QoS. Consequently, in the current commercialized wireless LAN environment, there is a limit in that a QSTA is unable to use a DLS service.

In a recent situation that such a wireless short-range communication technology as Wi-Fi and the like is widely applied to a market, connection between devices is performed not only based on a local network but also based on direct connection between devices. One of technologies enabling devices to be directly connected is Wi-Fi Direct.

Wi-Fi Direct corresponds to a network connectivity standard technology describing up to operations of a link layer. Since there is no definition on a regulation or a standard for an application of a higher layer, it is difficult to have compatibility and consistency of an operation after Wi-Fi Direct devices are connected with each other. For this reason, such a standard technology including higher layer application technology as WFDS (Wi-Fi Direct service) is under discussion by WFA (Wi-Fi alliance).

The WFA has announced such a new standard for delivering data via a direct connection between mobile devices as Wi-Fi Direct. Hence, related industries are actively developing a technology for satisfying the Wi-Fi Direct standard. In a strict sense, the Wi-Fi Direct is a marketing terminology and corresponds to a brand name. A technology standard for the Wi-Fi Direct is commonly called Wi-Fi P2P (peer to peer). Hence, the present invention describing Wi-Fi-based P2P technology may be able to use Wi-Fi Direct and Wi-Fi P2P without any distinction. In a legacy Wi-Fi network, a user accesses the legacy Wi-Fi network via an AP (access point) and accesses the Internet to use a device on which Wi-Fi is mounted. A data communication method via direct connection between devices is also used in a legacy communication by some users in a manner of being mounted on a device (e.g., a cellular phone, a note PC, etc.) on which a wireless communication technology such as Bluetooth is mounted. Yet, according to the data communication method, transmission speed is slow and transmission distance is limited to within 10 m. In particular, when the data communication method is used for transmitting massive data or is used in environment at which many Bluetooth devices exist, there exists a technical limit in performance capable of being felt by a user.

Meanwhile, Wi-Fi P2P maintains most of functions of the legacy Wi-Fi standard and includes an additional part for supporting direct communication between devices. Hence, the Wi-Fi P2P can sufficiently utilize hardware and physical characteristics of a device on which a Wi-Fi chip is mounted and is able to provide device-to-device P2P communication by upgrading a software function only.

As widely known, the device on which the Wi-Fi chip is mounted is extending to various ranges including a note PC, a smartphone, a smart TV, a game console, a camera and the like. For the device, sufficient numbers of suppliers and technology development personnel have been formed. Yet, software development supporting the Wi-Fi P2P standard is not vitalized yet. This is because, although a Wi-Fi P2P standard is announced, related software capable of conveniently using the Wi-Fi P2P standard is not distributed.

There exists a device playing a role of an AP in a legacy infrastructure network in a P2P group. The device is called a P2P group owner (GO) in a P2P standard. Various P2P clients may exist on the basis of the P2P GO. One GO exists in a single P2P group only and all remaining devices become client devices.

Recently, the use of NFC (near field communication) is increasing. Hence, it is necessary to have a method of providing a service in environment in which a plurality of systems or interfaces are provided.

DISCLOSURE

Technical Problem

This specification relates to a method and apparatus for performing service discovery in a wireless communication system.

This specification relates to a method and apparatus for performing service discovery using NFC on the basis of an application service platform (ASP) in a wireless communication system.

This specification relates to a method for providing information included in a frame used when service discovery is performed using NFC in a wireless communication system.

Technical Solution

To achieve these and other advantages and in accordance with the purpose of the present invention, as embodied and broadly described, according to one embodiment, a method for performing service discovery by means of a first device in a wireless communication system, the method comprising: transmitting a handover request message to a second device by using near field communication (NFC), and receiving a handover selection message from the second device by using NFC, the handover selection message includes information on P2P connection and ASP session formation.

To further achieve these and other advantages and in accordance with the purpose of the present invention, according to a different embodiment, a first device for performing service discovery in a wireless communication system, the first device comprising: a reception module for receiving information from an external device, a transmission module for transmitting information from the external device, and a processor is configured to control the reception module and the transmission module, wherein the processor is further configured to: transmit a handover request message to a second device by using NFC (Near Field Communication), and receive a handover selection message from the second device by using NFC, wherein the handover selection message includes information on P2P connection and ASP session formation.

Following items can be commonly applied to the method of performing service discovery in a wireless communication system and an apparatus therefor.

According to one embodiment of the present specification, the service discovery is performed per service, and the handover request message and the handover selection message are messages for service discovery of a first service.

According to one embodiment of the present specification, the service discovery of the first service is completed when the first device transmits the handover request message to the second device and receives the handover selection message from the second device.

According to one embodiment of the present specification, the method further comprising: performing the P2P connection and ASP session formation on the basis of information on the P2P connection and ASP session formation included in the handover selection message.

According to one embodiment of the present specification, the information on the P2P connection and ASP session formation included in the handover selection message, includes at least any one or more of service status, service name and ASP CP (Application Service Platform Coordination Protocol) version information.

According to one embodiment of the present specification, the information on the P2P connection and ASP session formation included in the handover selection message is transmitted in verb record of the handover selection message.

According to one embodiment of the present specification, the ASP CP version information of the information on the P2P connection and ASP session formation included in the handover selection message is transmitted in P2P Wi-Fi Carrier Configuration record of the handover selection message.

According to one embodiment of the present specification, the service status and the service name of the information on the P2P connection and ASP session formation included in the handover selection message are included in the verb record of the handover selection message.

According to one embodiment of the present specification, the handover selection message further includes list information for a service that may be supported by the second device.

According to one embodiment of the present specification, the list information for the service that may be supported by the second device is included in the P2P Wi-Fi Carrier Configuration record of the handover selection message.

Advantageous Effects

The specification may provide a method and apparatus for performing service discovery in a wireless communication system.

According to this specification, service discovery may be performed using NFC on the basis of an application service platform (ASP) in a wireless communication system.

This specification may provide information included in a frame used when service discovery is performed using NFC in a wireless communication system.

It will be appreciated by persons skilled in the art that that the effects that could be achieved with the present invention are not limited to what has been particularly described hereinabove and other advantages of the present invention will be more clearly understood from the following detailed description.

BEST MODE FOR CARRYING OUT THE INVENTION

Figure 1:
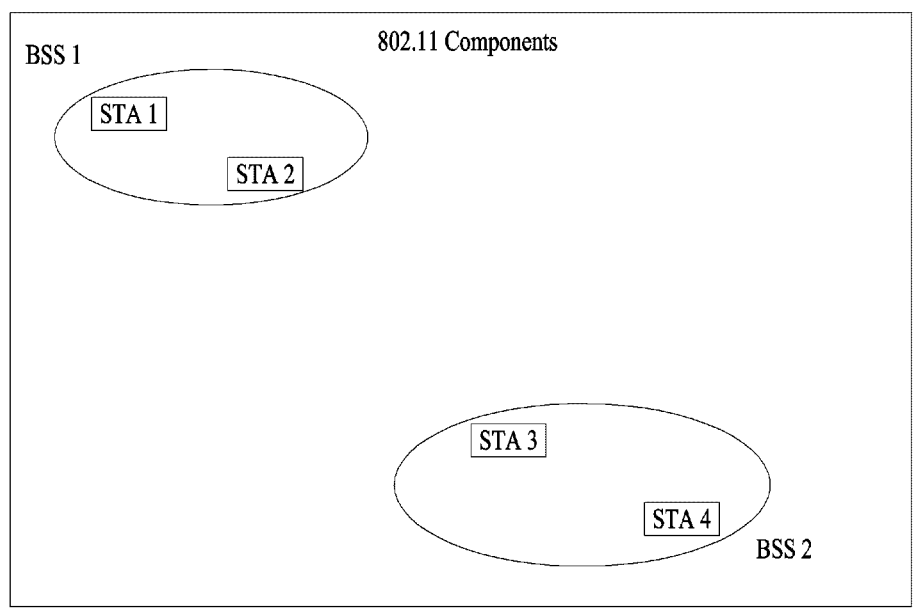
FIG. 1 illustrates a structure of an IEEE 802.11 system to which the present invention may be applied.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide the full understanding of the present invention. However, it will be apparent to those skilled in the art that the present invention may be implemented without such specific details.

The following embodiments can be achieved by combinations of structural elements and features of the present invention in prescribed forms. Each of the structural elements or features should be considered selectively unless specified separately. Each of the structural elements or features may be carried out without being combined with other structural elements or features. Also, some structural elements and/or features may be combined with one another to constitute the embodiments of the present invention. The order of operations described in the embodiments of the present invention may be changed. Some structural elements or features of one embodiment may be included in another embodiment, or may be replaced with corresponding structural elements or features of another embodiment.

Specific terminologies in the following description are provided to help the understanding of the present invention. And, these specific terminologies may be changed to other formats within the technical scope or spirit of the present invention.

Occasionally, to avoid obscuring the concept of the present invention, structures and/or devices known to the public may be skipped or represented as block diagrams centering on the core functions of the structures and/or devices. In addition, the same reference numbers will be used throughout the drawings to refer to the same or like parts in this specification.

The embodiments of the present invention can be supported by the disclosed standard documents disclosed for at least one of wireless access systems including IEEE 802 system, 3GPP system, 3GPP LTE system, LTE-A (LTE-Advanced) system and 3GPP2 system. In particular, the steps or parts, which are not explained to clearly reveal the technical idea of the present invention, in the embodiments of the present invention may be supported by the above documents. Moreover, all terminologies disclosed in this document can be supported by the above standard documents.

The following embodiments of the present invention can be applied to a variety of wireless access technologies, for example, CDMA (code division multiple access), FDMA (frequency division multiple access), TDMA (time division multiple access), OFDMA (orthogonal frequency division multiple access), SC-FDMA (single carrier frequency division multiple access) and the like. CDMA can be implemented with such a radio technology as UTRA (universal terrestrial radio access), CDMA 2000 and the like. TDMA can be implemented with such a radio technology as GSM/GPRS/EDGE (Global System for Mobile communications)/General Packet Radio Service/Enhanced Data Rates for GSM Evolution). OFDMA can be implemented with such a radio technology as IEEE 802.11(Wi-Fi), IEEE 802.16 (Wi-MAX), IEEE 802.20, E-UTRA (Evolved UTRA), etc.

Although the terms such as "first" and/or "second" in this specification may be used to describe various elements, it is to be understood that the elements are not limited by such terms. The terms may be used to identify one element from another element. For example, a first element may be referred to as a second element, and vice versa within the range that does not depart from the scope of the present invention.

In the specification, when a part "comprises" or "includes" an element, it means that the part further comprises or includes another element unless otherwise mentioned. Also, the terms " . . . unit", " . . . module" disclosed in the specification means a unit for processing at least one function or operation, and may be implemented by hardware, software or combination of hardware and software.

For clarity, the following description focuses on IEEE 802.11 systems. However, technical features of the present invention are not limited thereto.

FIG. 1 is a diagram for an example of a structure of IEEE 802.11 system to which the present invention is applicable.

IEEE 802.11 structure can consist of a plurality of configuration elements and a WLAN supporting mobility of an STA, which is transparent to an upper layer, can be provided by interaction of a plurality of the configuration elements. A basic service set (hereinafter abbreviated BSS) may correspond to a basic configuration block in IEEE 802.11 LAN. FIG. 1 shows an example that there exist two BSSs (BSS 1 and BSS 2) and two STAs are included in each of the BSSs as members, respectively (STA 1 and STA 2 are included in the BSS 1 and STA 3 and STA 4 are included in the BSS 2). In this case, an STA indicates a device operating according to MAC (medium access control)/PHY (physical) standard of IEEE 802.11. An STA includes an AP (access point) STA (simply, an AP) and a non-AP STA. An AP corresponds to a device providing network access (e.g., WLAN) to a non-AP STA via a wireless interface. The AP can be configured by a fixed form or a mobile form and includes a mobile wireless device (e.g., a laptop computer, a smartphone, etc.) providing a hot-spot. The AP corresponds to a base station (BS), a Node-B, an evolved Node-B (eNB), a base transceiver system (BTS), a femto BS and the like in a different wireless communication field. The non-AP STA corresponds to a device directly controlled by a user such as a laptop computer, a PDA, a wireless modem, a smartphone and the like. The non-AP STA can be called a device, a wireless transmit/receive unit (WTRU), a user equipment (UE), a mobile station (MS), a mobile device, a mobile subscriber station (MSS), and the like.

An oval indicating a BSS in FIG. 1 may be comprehended as a coverage area of the STAs included in the BSS to maintain a communication. This area can be called a basic service area (hereinafter abbreviated BSA). A BSS of a most basic type in IEEE 802.11 LAN may correspond to an independent BSS (hereinafter abbreviated IBSS). For instance, the IBSS may have a minimum form consisting of two STAs only. The BSS (BSS 1 or BSS 2), which is the simplest form and omitted different configuration elements, in FIG. 1 may correspond to a representative example of the IBSS. This sort of configuration is available when the STAs are able to directly communicate with each other. And, this kind of LAN can be configured when a LAN is necessary instead of being configured in advance. Hence, this network may be called an ad-hoc network.

When power of an STA is turned on or turned off or an STA enters into a BSS area or gets out of the BSS area, a membership of the STA in a BSS can be dynamically changed. In order to be a member of the BSS, the STA can join the BSS using a synchronization process. In order to access all services based on a BSS structure, the STA can be associated with the BSS.

Figure 2:
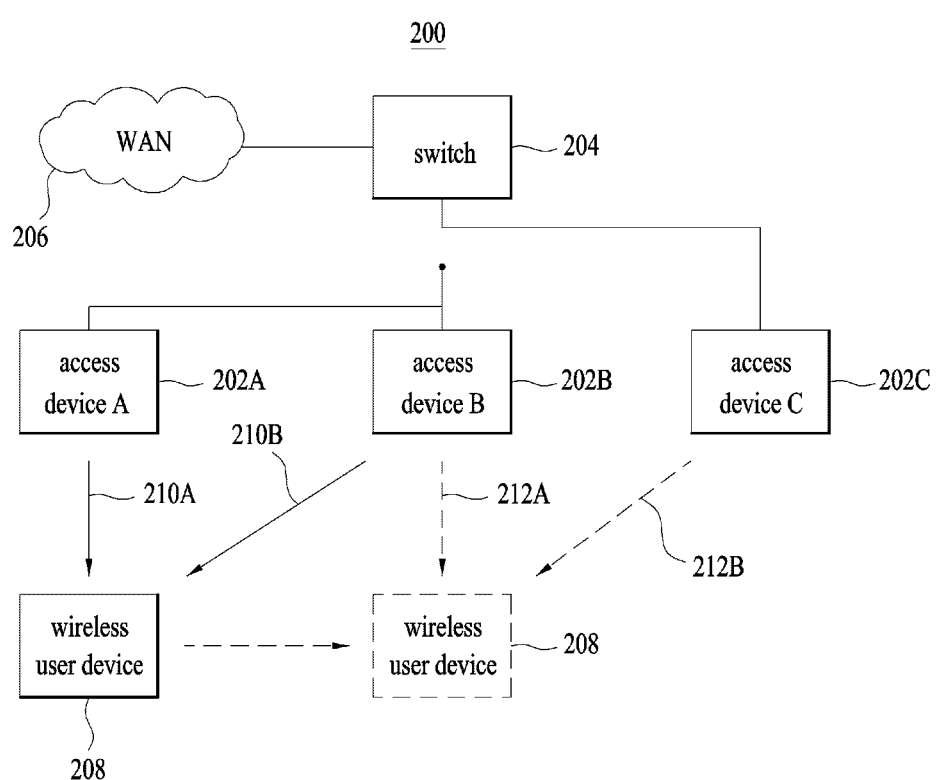
FIG. 2 is a block diagram illustrating an exemplary operation of a communication system that adopts access devices and wireless user equipments.

FIG. 2 is a block diagram for an example of a communication system 200 adopting access devices (e.g., AP STAs) 220A/202B/202C and wireless user devices (e.g., non-AP STAs).

Referring to FIG. 2, access devices 202A to 202C are connected with a switch 204 providing access to a WAN (wide area network) 206 such as the Internet. Each of the access devices 202A to 202C provides wireless access to wireless devices belonging to a coverage area (not depicted) of the access device via a time division multiplexed network. Hence, the access devices 202A to 202C commonly provide a total WLAN coverage area of the system 200. For instance, a wireless device 208 may exist in a coverage area of the access devices 202A and 202B in a position represented by a box of a line. Hence, the wireless device 208 can receive beacons from each of the access devices 202A/202B as shown by line arrows 210A and 210B. If the wireless device 208 roams to a dotted line box from the line box, the wireless device 208 enters a coverage area of the access device 202C and leaves a coverage area of the access device 202A. Hence, as shown by dotted lines 212A and 212B, the wireless device 208 can receive beacons from the access devices 202B/202C.

When the wireless device 208 roams in the total WLAN coverage area provided by the system 200, the wireless device 208 can determine which device provides best access to the wireless device 208. For instance, the wireless device 208 repeatedly scans beacons of adjacent access devices and may be able to measure signal strength (e.g., power) related to each of the beacons. Hence, the wireless device 208 can be connected with an access device providing optimal network access based on maximum beacon signal strength. The wireless device 208 may be able to use a different reference related to optimal access. For instance, the optimal access may be associated with more preferable services (e.g., contents, data rate and the like).

Figure 3:
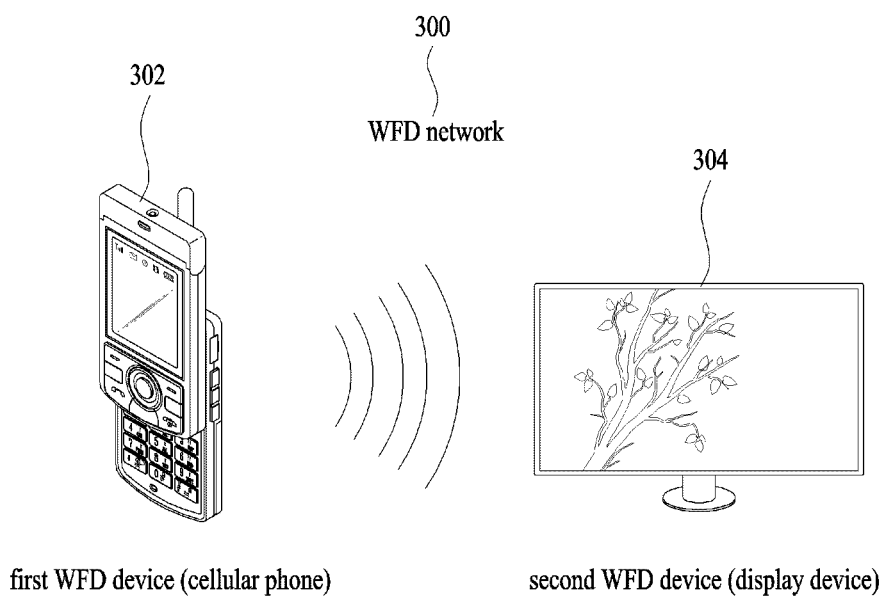
FIG. 3 illustrates a WFD (Wi-Fi Direct) network.

FIG. 3 is a diagram for an example of a WFD (Wi-Fi Direct) network.

A WFD network corresponds to a network capable of performing D2D (device-to-device) (or peer to peer (P2P)) communication although Wi-Fi devices do not participate in a home network, an office network or a hot-spot network. The WFD network is proposed by Wi-Fi alliance. In the following, WFD-based communication is called WFD D2D communication (simply, D2D communication) or WFD P2P communication (simply, P2P communication). And, a device performing the WFD P2P communication is called a WFD P2P device, simply, a P2P device.

Referring to FIG. 3, a WFD network 300 can include at least one or more Wi-Fi devices including a first WFD device 302 and a second WFD device 304. A WFD device includes devices supporting Wi-Fi such as a display device, a printer, a digital camera, a projector, a smartphone and the like. And, the WFD device includes a non-AP STA and an AP STA. Referring to an example shown in the drawing, the first WFD device 302 corresponds to a smartphone and the second WFD device 304 corresponds to a display device. WFD devices in the WFD network can be directly connected with each other. Specifically, P2P communication may correspond to a case that a signal transmission path between two WFD devices is directly configured between the WFD devices without passing through a third device (e.g., an AP) or a legacy network (e.g., access WLAN via an AP). In this case, the signal transmission path directly configured between the two WFD devices may be restricted to a data transmission path. For instance, P2P communication may correspond to a case that a plurality of non-STAs transmit data (e.g., audio/image/text message information etc.) without passing through an AP. A signal transmission path for control information (e.g., resource allocation information for P2P configuration, wireless device identification information and the like) can be directly configured between WFD devices (e.g., between a non-AP STA and a non-AP STA, between a non-AP STA and an AP), between two WFD devices (e.g., between a non-AP STA and a non-AP STA) via an AP or between an AP and a corresponding WFD device (e.g., an AP and a non-AP STA #1, between an AP and a non-AP STA #2).

Figure 4:
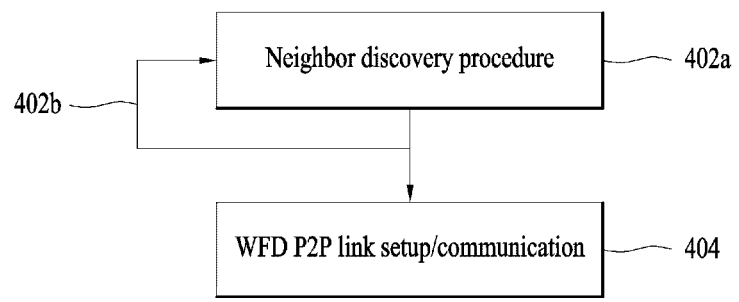
FIG. 4 illustrates a procedure of configuring a WFD network.

FIG. 4 is a flowchart for an example of a procedure of configuring a WFD network.

Referring to FIG. 4, a procedure of configuring a WFD network can be mainly divided into two procedures. A first procedure corresponds to a neighbor (device) discovery (ND) procedure [S402a] and a second procedure corresponds to a P2P link configuration and communication procedure [S404]. A WFD device (e.g., 302 in FIG. 3) finds out a different neighboring device (e.g., 304 in FIG. 3) in coverage (of the WFD device) via the neighbor discovery procedure and may be able to obtain information necessary for associating with the neighboring WFD device, e.g., information necessary for pre-association. In this case, the pre-association may indicate second layer pre-association in a wireless protocol. The information necessary for the pre-association can include identification information on the neighboring WFD device for example. The neighbor discovery procedure can be performed according to an available radio channel [S402b]. Subsequently, the WFD device 302 can perform a WFD P2P link configuration/communication procedure with the different WFD device 304. For instance, the WFD device 302 can determine whether the WFD device 304 corresponds to a WFD device not satisfying a service requirement of a user after the WFD device 302 is connected with the neighboring WFD device 304. To this end, the WFD device 302 is second layer pre-associated with the neighboring WFD device 304 and may be then able to search for the WFD device 304. If the WFD device 304 does not satisfy the service requirement of the user, the WFD device 302 disconnects the second layer connection established with the WFD device 304 and may be able to establish the second layer connection with a different WFD device. On the contrary, if the WFD device 304 satisfies the service requirement of the user, the two WFD devices 302/304 can transceive a signal with each other via a P2P link.

Figure 5:
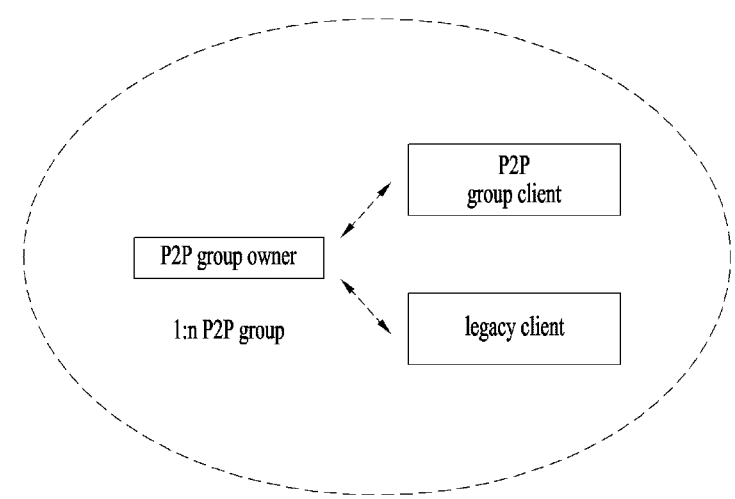
FIG. 5 is a diagram illustrating a typical P2P network topology.

FIG. 5 is a diagram for a typical P2P network topology.

As shown in FIG. 5, a P2P GO can be directly connected with a client including a P2P function. Or, the P2P GO can be connected with a legacy client, which has no P2P function.

Figure 6:
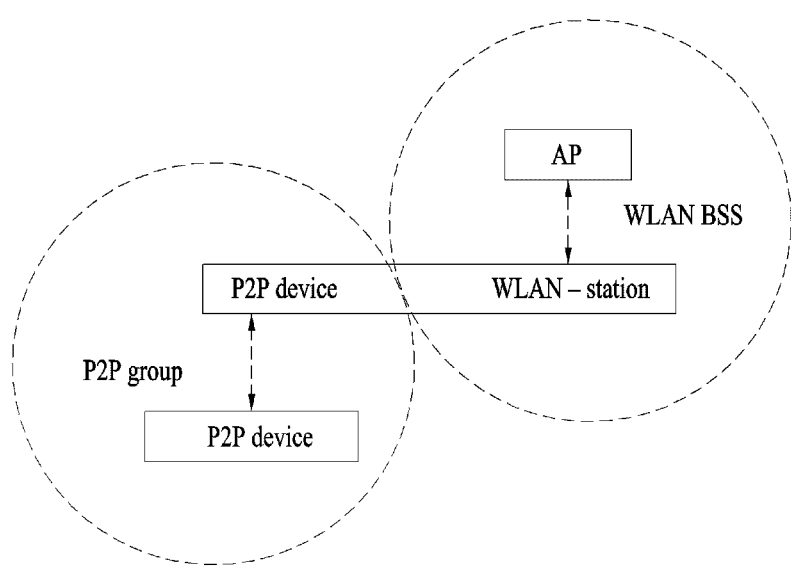
FIG. 6 is a diagram illustrating that one P2P device forms a P2P group and at the same time is operated as STA of WLAN to be connected with AP.

FIG. 6 is a diagram for a situation that a single P2P device forms a P2P group and is connected with an AP in a manner of operating as an STA of WLAN at the same time.

As shown in FIG. 6, according to P2P technical standard, a situation that a P2P device operates in the aforementioned mode is defined as a concurrent operation.

In order for a series of P2P devices to form a group, a P2P GO is determined based on a group owner intent value of a P2P attribute ID. The group owner intent value may have a value ranging from 0 to 15. P2P devices are exchanging the values and a P2P device including a highest value becomes the P2P GO. Meanwhile, in case of a legacy device not supporting the Wi-Fi P2P technology, although the legacy device can belong to a P2P group, a function of the legacy device is limited to a function of accessing an infrastructure network via the P2P GO.

According to Wi-Fi P2P standard, since a P2P GO transmits a beacon signal using OFDM (orthogonal frequency division multiplexing), a P2P device does not support 11b standard. Instead, 11a/g/n can be used as Wi-Fi P2P device.

In order to perform an operation of connecting a P2P GO and a P2P client with each other, a P2P standard mainly includes 4 functions described in the following.

First of all, P2P discovery is dealing with such a description entry as device discovery, service discovery, group formation and P2P invitation. According to the device discovery, 2 P2P devices exchange device-related information such as a device name of a counterpart device or a device type with each other via an identical channel. According to the service discovery, a service to be used and service-related information are exchanged with each other via P2P. According to the group formation, it corresponds to a function that a device to be a P2P GO is determined and a new group is formed. According to the P2P invitation, it corresponds to a function that a permanently formed P2P group is summoned or a function of making a P2P device join a legacy P2P group.

Secondly, P2P group operation explains P2P group formation and termination, connection to a P2P group, communication in a P2P group, a service for P2P client discovery, operation of a persistent P2P group and the like.

Thirdly, P2P power management is dealing with a method of managing power of a P2P device and a method of processing a signal on power saving mode timing.

Lastly, managed P2P device is dealing with a method of forming a P2P group in a single P2P device and a method of accessing an infrastructure network via a WLAN AP at the same time.

Characteristics of a P2P group are explained in the following. A P2P group is similar to a legacy infrastructure BSS (basic service set) in that a P2P GO plays a role of an AP and a P2P client plays a role of an STA. Hence, software capable of performing a role of a GO and a role of a client should be mounted on a P2P device. The P2P device is distinguished by using a P2P device address such as a MAC address. Yet, when the P2P device performs communication in a P2P group, the P2P device uses a P2P interface address. In this case, it is not necessary for the P2P device to use a single identifier (a globally unique ID) address. The P2P group includes a single identifier P2P group ID. The single identifier P2P group ID consists of a combination of an SSID (service set identifier) and a P2P device address. Wi-Fi P2P standard uses WPA2-PSK/AES for security. A life cycle of a P2P group has a temporary connection method and a persistent connection method for attempting an identical connection after prescribed time. In case of a persistent group, once a P2P group is formed, a role, a certificate, an SSID and a P2P group ID are cached. When connection is reestablished, connection of a group can be promptly established by applying an identical connection form.

In the following, Wi-Fi P2P connection method is explained. A Wi-Fi device mainly performs a connection procedure of two phases. First one corresponds to a phase that two P2P devices find out a counterpart device and a second one corresponds to a group formation phase for determining a role of a P2P GO or a role of a P2P client between discovered devices. First of all, the finding phase corresponds to a phase of connecting P2P devices with each other. In particular, the finding phase includes a search state and a listen state. The search state performs active search using a probe request frame. In this case, a range of the search is restricted for a quick search. For the quick search, such a social channel as a channel 1, 6 and 11 are used. A P2P device of the listen state maintains a reception state in a manner of selecting one channel from the 3 social channels. If the P2P device receives a probe request frame transmitted by a different P2P device of the search state, the P2P device transmits a probe response frame to the different P2P device in response to the probe request frame. P2P devices continuously repeat the search state and the listen state and may be able to arrive at a channel common to the P2P devices. The P2P devices find out a counterpart device and use a probe request frame and a probe response frame to selectively combine with the counterpart device and to discover a device type, a manufacturer, or a friendly device name. In order to check a service existing in the internal of the P2P devices and compatible between the devices, it may use the service discovery. The service discovery is used to determine whether a service provided in the internal of each device is compatible with a different device. According to the P2P standard, a specific service discovery standard is not designated. A user of a P2P device searches for a neighboring P2P device and a service provided by the P2P device and may be then able to connect with a device or a service preferred by the user.

As a second phase, a group formation phase is explained in the following. If a P2P device completes the aforementioned find phase, checking existence of a counterpart device is completed. Based on this, two P2P devices should enter a GO negotiation phase to configure a BSS. The negotiation phase is divided into two sub phases. One is a GO negotiation phase and another is a WPS (Wi-Fi protected setup) phase. In the GO negotiation phase, the two P2P devices negotiate a role of a P2P GO and a role of a P2P client with each other and an operation channel to be used in the internal of a P2P group is configured. In the WPS phase, such a usual job performed in a legacy WPS as exchanging PIN information inputted by a user using a keypad or the like, simple setup via a push button and the like is performed. In a P2P group, a P2P GO plays core role of the P2P group. The P2P GO assigns a P2P interface address, selects an operation channel of the group and transmits a beacon signal including various operation parameters of the group. In the P2P group, a beacon signal can be transmitted by the P2P GO only. A P2P device can quickly check the P2P GO using the beacon signal in a scan phase corresponding to a connection initial phase and performs a role of participating in the group. Or, the P2P GO can initiate a P2P group session by itself or may be able to initiate a session after the method mentioned earlier in the P2P finding phase is performed. Hence, since a value intended to be the P2P GO is controlled by an application or a higher layer service instead of a value fixed by a certain device, a developer can select an appropriate value, which is intended to be the P2P GO, according to a usage of each application program.

Subsequently, P2P addressing is explained in the following. A P2P device uses a P2P interface address in a manner of assigning a P2P interface address using a MAC address in a P2P group session. In this case, the P2P interface address of a P2P GO corresponds to a BSSID (BSS identifier). The BSSID practically corresponds to a MAC address of the P2P GO.

Connection release of a P2P group is explained in the following. If a P2P session is terminated, a P2P GO should inform all P2P clients of termination of a P2P group session via De-authentication. A P2P client can also inform the P2P GO of connection release. In this case, if possible, it is necessary to perform a disassociation procedure. Having received a connection release request of a client, the P2P GO can identify that connection of the P2P client is released. If the P2P GO detects a P2P client making a protocol error or performing an operation of interrupting connection of a P2P group, the P2P GO generates rejection of authentication or a denial of association. In this case, the P2P GO records a concrete failure reason on an association response and transmits the association response to the P2P client.

Figure 7:
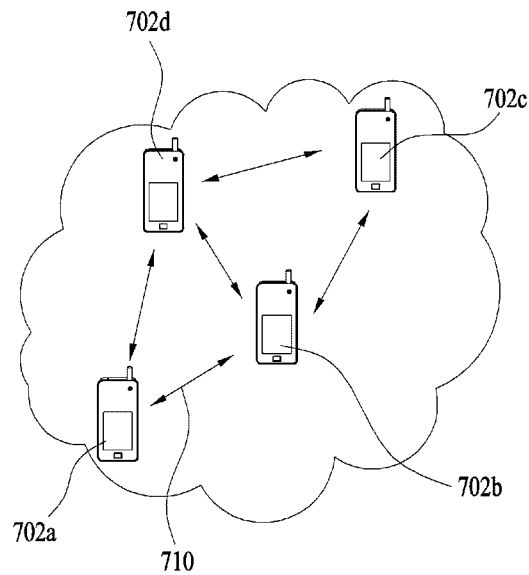
FIG. 7 is a diagram illustrating an aspect of a WFD network when P2P is applied thereto.

FIG. 7 is a diagram for a WFD network aspect in case that P2P is applied.

FIG. 7 shows an example of a WFD network aspect in case of applying a new P2P application (e.g., social chatting, location-based service provision, game interworking and the like). Referring to FIG. 7, a plurality of P2P devices 702a to 702d perform P2P communication 710 in a WFD network. P2P device(s) constructing the WFD network frequently change due to movement of the P2P device or the WFD network itself can be newly generated or disappeared dynamically/in a short time. Hence, characteristic of the new P2P application part is in that P2P communication can be performed and terminated dynamically/in a short time between a plurality of the P2P devices in dense network environment.

Figure 8:
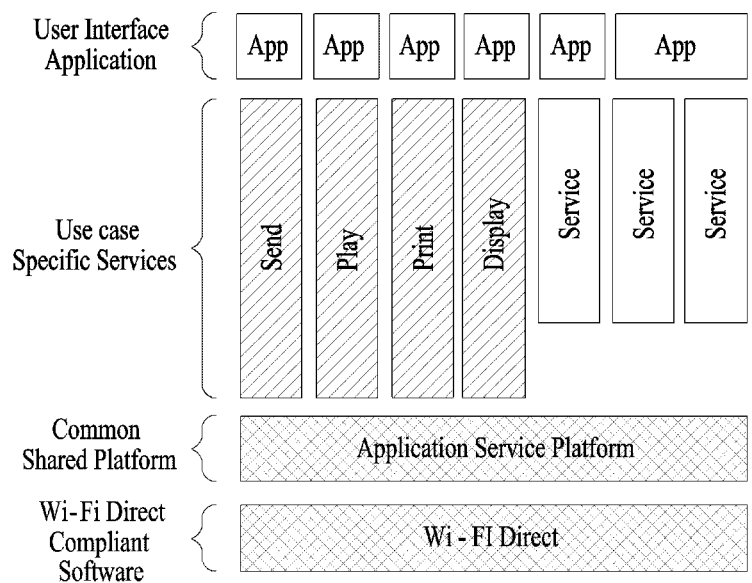
FIG. 8 is a brief block diagram illustrating a WFDS (Wi-Fi Direct Services) device.

FIG. 8 is a simplified block diagram for a WFDS (Wi-Fi Direct services) device.

A platform for such an application service as an ASP (application service platform) is defined for a Wi-Fi Direct MAC layer and above. The ASP plays a role of session management, command processing of a service, control between ASPs and security between a higher application and a lower Wi-Fi Direct. 4 basic services including a Send service, a Play service, a Display service and a Print service defined by WFDS, a corresponding application and an UI (user interface) are supported at the top of the ASP. In this case, the Send service corresponds to a service capable of performing file transfer between two WFDS devices and an application therefor. The Play service corresponds to a streaming service capable of sharing A/V, a picture, and music based on a DLNA between two WFDS devices and an application therefor. The Print service defines a service capable of outputting a document and a picture between a device including contents such as a document, a picture and the like and a printer and an application therefor. The Display service defines a service enabling screen sharing between Miracast source of WFA and Miracast sink and an application therefor. And, an enablement service is defined for the use of an ASP common platform in case of supporting a third party application except a basic service.

Among terminologies described in the present invention, such a terminology as a service hash is formed from a service name using a first 6 octets of a service hash algorithm (e.g., SHA256 hashing) of a service name. A service hash used by the present invention does not mean a specific service hash. Instead, it may be preferable to comprehend the service hash as a sufficient representation of a service name using a probe request/response discovery mechanism. As a simple example, if a service name corresponds to "org.wifi.example", 6 bytes of a forepart of a value of which the service name is hashed by the SHA256 corresponds to a hash value.

In WFDS, if a hash value is included in a probe request message and a service is matched with each other, it may be able to check whether the service is supported in a manner of responding by a probe response message including a service name. In particular, the service name corresponds to a name of a user readable service of a DNS form. A service hash value indicates upper 6 bytes among a value of 256 bytes of the service name generated by an algorithm (e.g., SHA256). As mentioned in the foregoing example, if a service name corresponds to "org.wifi.example", a service hash may correspond to a value of "4e-ce-7e-64-39-49".

Hence, a part of a value of which a service name is hashed by an algorithm is represented as a service hash (information) in the present invention. The service hash can be included in a message as information.

Method of Configuring Legacy WFDS

Figure 9:
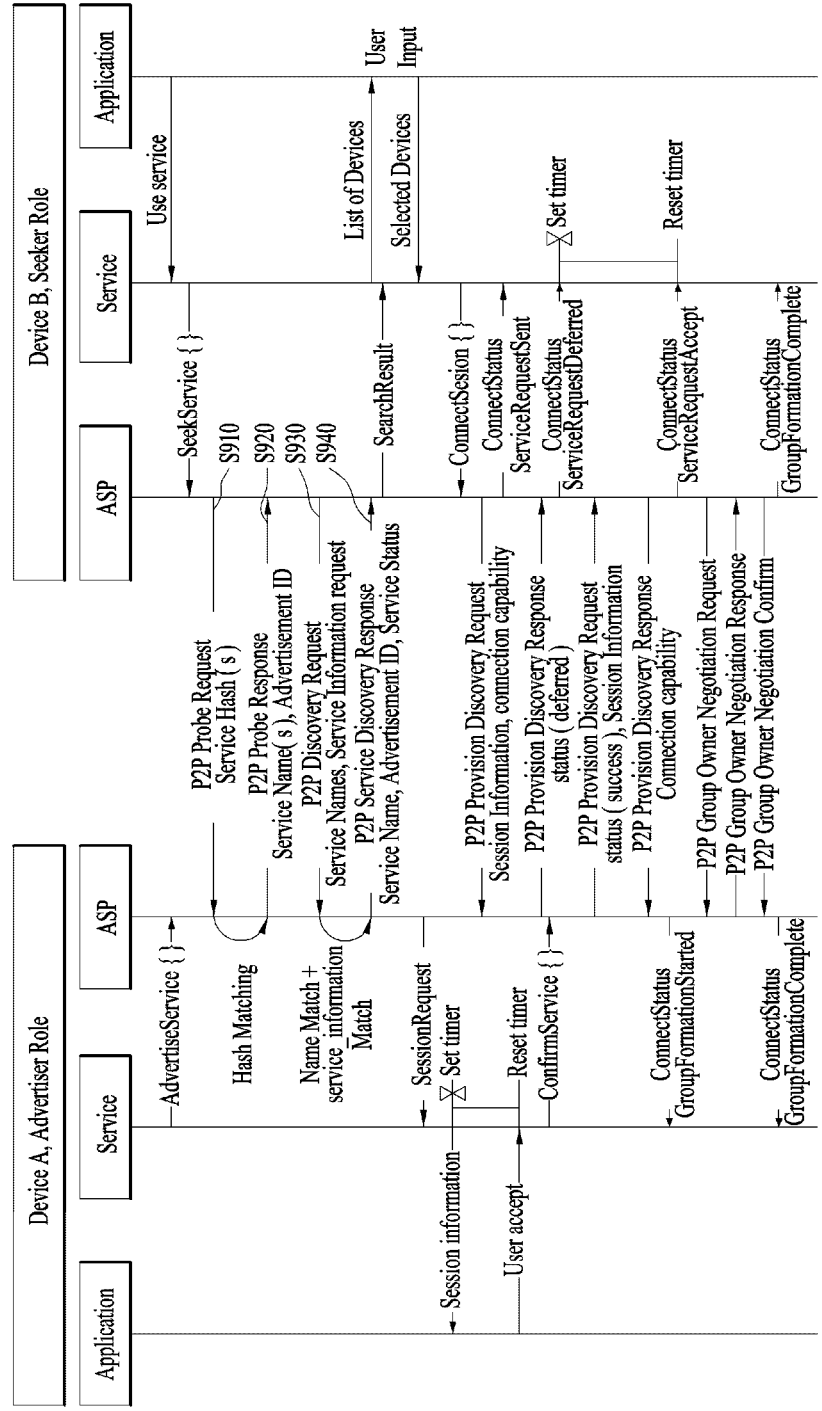
FIG. 9 is a diagram illustrating a procedure of connecting WFDS session by performing device discovery and service discovery between WFDS devices in a legacy WFDS.

FIG. 9 is a flowchart for a process of establishing a WFDS session by performing device discovery and service discovery between WFDS devices in a legacy WFDS.

For clarity, as shown in FIG. 4, assume that a device A plays a role of an advertiser advertising a WFDS capable of being provided by the device A to a seeker and a device B plays a role in seeking an advertised service. The device A corresponds to a device intending to advertise a service of the device A and a counterpart device intends to start the service in a manner of finding out the service of the device A. The device B performs a procedure of finding out a device supporting a service according to a request of a higher application or a user.

A service end of the device A advertises a WFDS capable of being provided by the service end to an application service platform (ASP) end of the device A. A service end of the device B can also advertise a WFDS capable of being provided by the service end to an ASP end of the device B. In order for the device B to use a WFDS as a seeker, an application end of the device B indicates a service to be used to the service end and the service end indicates the ASP end to find out a target device to use the WFDS.

The ASP end of the device B transmits a P2P (peer to peer) probe request message to discover its WFDS target device (S910). At this time, the P2P probe request message includes service name of a service desired to be discovered by the ASP end or capable of being supported by the ASP end in a service hash type. The device A that has received the P2P probe request message from the seeker transmits a P2P probe response message to the device B in response to the P2P probe request message if the device A supports the corresponding service (S920). The P2P probe response message includes a service name or service supported by hash value and an advertise ID value. This procedure is a device discovery procedure capable of knowing that the device A and the device B are WFDS devices to each other and a service which is supported.

Afterwards, the device A and the device B can optionally know details of a specific service through a P2P service discovery procedure. The device B that has discovered the device which may perform WFDS with itself transmits a P2P service discovery request message to the corresponding device (S930). The device A that has received the P2P service discovery request message from the device B matches the service advertised by the service end of the device A with P2P service name and P2P service information, which are received from the device B, at the ASP end and transmits a P2P service discovery response message to the device B (S940). In this case, a GAS protocol defined in the IEEE 802.11u is used. In this way, if a request for service seek is completed, the device B may notify an application and a user of the seek result. At this time, a group of Wi-Fi Direct is not formed, and if a user selects a service and connect session is performed by the service, P2P group formation is performed.

Also, as a detailed embodiment of the present invention. ASP operated based on at least any one of WFA, WFDS, Wi-Fi Direct, NAN (Neighbor Awareness Networking), NFC (Near Field Communication), BLE (Bluetooth Low Energy) and WLAN infrastructure may be provided. At this time, the aforementioned WFDS may be one interface. That is, the interface may refer to a method for supporting an operation of a device. At this time, a detailed method for interworking ASP with device/service discovery on the basis of the aforementioned interfaces will be described.

Figure 10:
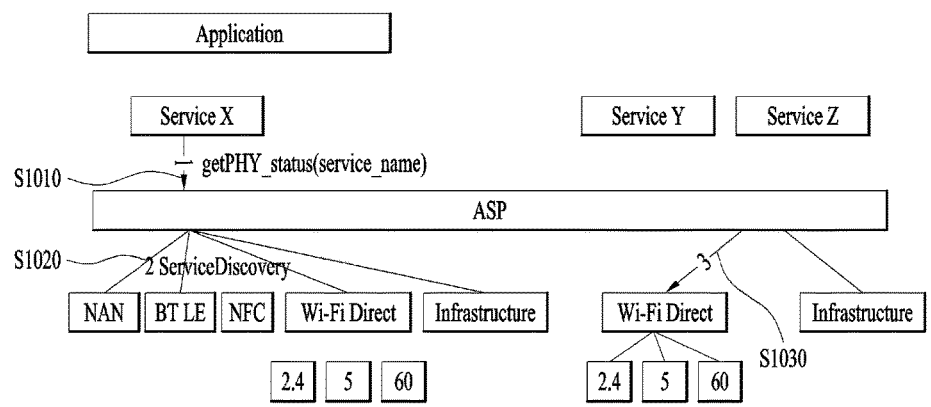
FIG. 10 is a diagram illustrating an application service platform (ASP) that supports a plurality of interfaces.

FIG. 10 is a diagram illustrating an application service platform (ASP) that supports a plurality of interfaces.

As described above, as a device which supports WFDS, a service end of an advertiser device may advertise a service that may be provided by itself, and as another device which supports WFDS, a service end of a seeker device may command the ASP end to seek a target device which will use the corresponding service. That is, WFDS may conventionally be supported between devices through the ASP.

At this time, referring to FIG. 10, the ASP may support a plurality of interfaces. At this time, as an example, the ASP may support a plurality of interfaces for performing service discovery. Also, the ASP may support a plurality of interfaces for performing service connection.

At this time, as an example, the plurality of interfaces for performing service discovery may be at least any one of Wi-Fi Direct, NAN (Neighbor Awareness Networking), NFC (Near Field Communication), BLE (Bluetooth Low Energy) and WLAN infrastructure.

Also, the plurality of plurality of interfaces for performing service connection may be at least any one of Wi-Fi Direct, P2P and WLAN infrastructure. Also, as an example, the ASP may support a plurality of frequency bandwidths. At this time, as an example, the plurality of frequency bandwidths may be 2.4 GHz, 5 GHz, 60 GHz, etc. Also, as an example, the ASP may support information on a frequency bandwidth less than 1 GHz. That is, the ASP may support the plurality of frequency bandwidths, and is not limited to a specific frequency bandwidth.

Referring to FIG. 10, the first device may perform device discovery or service discovery for a first service by using the ASP. Afterwards, if a seek for device discovery or service discovery is completed, the first device may perform service connection on the basis of the seek result. At this time, as an example, an interface used for a seek of service discovery and an interface used for service connection may be different from each other, and may be selected from the plurality of interfaces.

Therefore, the ASP may need definition of information or parameter for supporting the plurality of interfaces. Hereinafter, the information or parameter for providing service using the ASP that supports the plurality of interfaces will be described.

In respect of the aforementioned ASP, as an example, the service end of the device may acquire information on a service discovery method and a service connection method, which may support a first service, from the ASP. At this time, the first service may be one service provided by the device, and is not limited to a specific service.

The service end of the device may page AdvertiseService( ) or SeekService( ) method to the ASP on the basis of the information acquired from the ASP. That is, the device may use the ASP as an advertiser or seeker to perform service discovery for the first service, and this may be the same as the existing ASP operation. Also, after the service discovery of the first service is performed, the device may perform service connection on the basis of the service discovery result. At this time, service connection may be P2P or WLAN infrastructure. At this time, as an example, since these two types of service connections support a plurality of frequency bandwidths, these service connections may be performed based on a preferred bandwidth.

In more detail, referring to FIG. 10, the service end of the device may send a message for a service to be used to the ASP by paging geatPHY_status (service_name) method. At this time, the service end may acquire information on a plurality of frequency bandwidths for a service discovery method and a service connection method, which are supported by the ASP, by receiving Return value from the ASP. As a result, the device may notify the ASP of a preferred connection method and preferred frequency bandwidth information with respect to the service and acquire information on the service discovery method and the discovery connection method, which are supported by the ASP. The ASP may perform service discovery on the basis of the information received from the service end to discover and connect a specific device, thereby using the service. The WLAN infrastructure and the P2P have been described, and the ASP for supporting the WLAN infrastructure and the P2P has been described.

Figure 11:
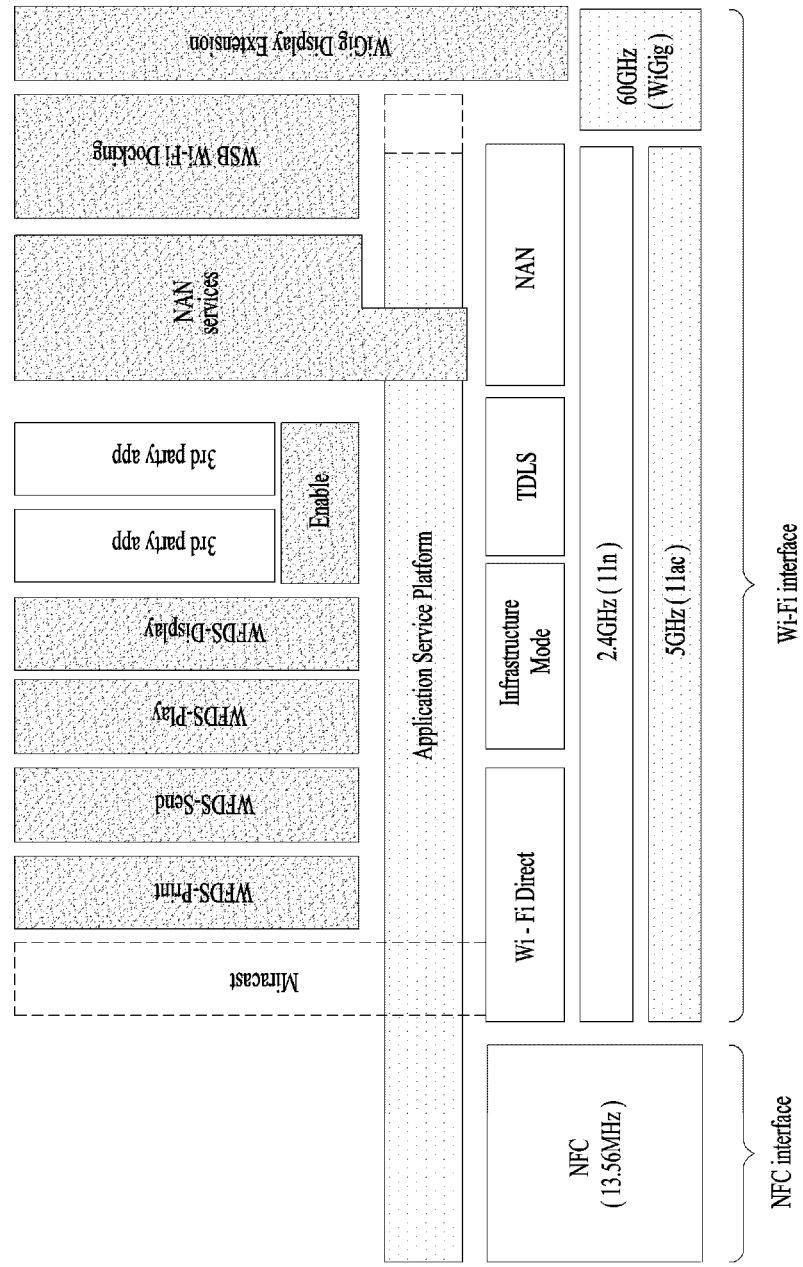
FIG. 11 is a block diagram illustrating services to which NFC interface in addition to Wi-Fi interface is added.

FIG. 11 is a block diagram illustrating services to which NFC interface in addition to Wi-Fi interface is added.

For example, as shown in FIG. 11, the existing Wi-Fi interface could use a frequency bandwidth of 2.4 GHz in 802.11n and a frequency bandwidth of 5 GHz in 802.11ac. At this time, NFC may be operated at a relatively low frequency bandwidth of 13.56 MHz. Services such as WFD (Wi-Fi Direct), infrastructure mode, TDLS (Tunneled Direct Link Setup), and NAN (Neighbor Area Network) may be used on the Wi-Fi interface. At this time, a method for unifying management by applying NFC to the aforementioned ASP is required. Also, as the WFDS technology is gradually developed, a support for a 3rd party application, etc. may be required.

At this time, as an example, if two devices of P2P support NFC, an NFC OOB (out-of-band) channel may optionally be used in the step of device discovery. NFC OOB device discovery may mean that the two P2P devices agree to a common channel for group formation and share provisioning information such as password of the device. Also, as an example, the P2P device or P2P group owner may use an NFC handover request/selection message for OOB device discovery. The NFC handover request/selection messages may be exchanged through OOB channel before group formation or P2P invitation. This will be described later.

Figure 12:
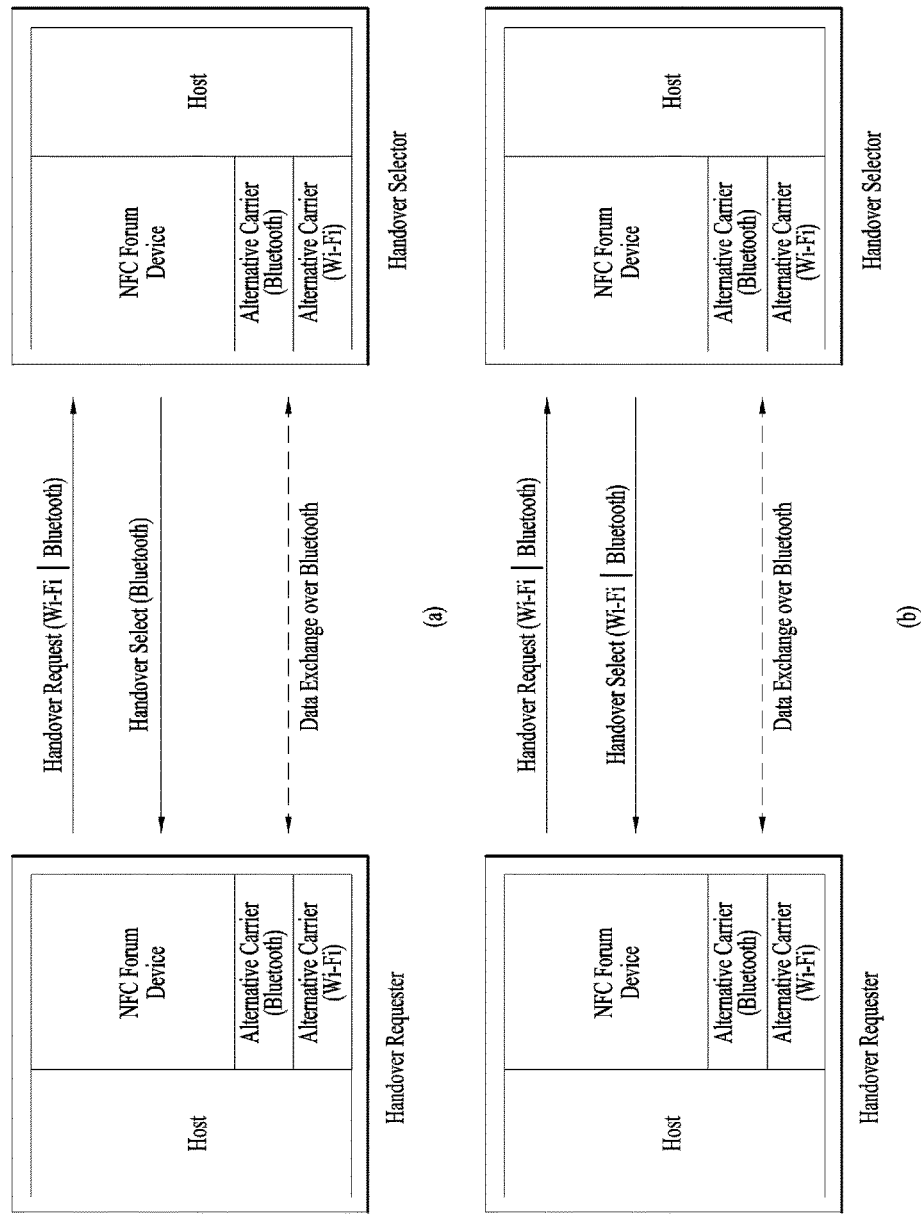
FIG. 12 is a diagram illustrating a method of exchanging an NFC handover request and a handover selection message in a device that supports NFC.

FIG. 12 is a diagram illustrating a method of exchanging an NFC handover request and a handover selection message in a device that supports NFC.

Referring to FIG. 12, two devices which support NFC may perform negotiation for at least one or more alternative carriers for data exchange. At this time, as an example, a device (hereinafter, referred to as handover requester) which requests handover may transmit a handover request message to a device (hereinafter, referred to as handover selector) which selects handover. At this time, as an example, the handover request message may include at least one or more alternative carriers. At this time, as an example, the alternative carriers may be set per interface. That is, different alternative carriers may means different interfaces.

For example, information on alternative carrier for Bluetooth and alternative carrier for Wi-Fi may be included in FIG. 12. Afterwards, the handover selector may receive a handover request message. If the handover selector receives the handover request message, the handover selector may select alternative carrier on the basis of the handover request message. At this time, the handover selector may perform selection depending on its supportable alternative carrier. Afterwards, the handover selector may transmit a handover selection message to the handover requester. Then, the handover requester and the handover selector may perform data exchange on the basis of the selected alternative carrier.

At this time, as an example, FIG. 12(a) may be an example for a case that one of a plurality of alternative carriers is selected. At this time, the handover requester and the handover selector may perform data exchange on the basis of the selected alternative carrier.

On the other hand, FIG. 12(b) may be an example for a case that the handover selector supports a plurality of alternative carriers, wherein information on the plurality of alternative carriers may be included in the handover selection message. At this time, if the handover requester receives a handover selection message, the handover requester may exchange data by using a preferred one of the plurality of alternative carriers. Also, if data exchange is unavailable using the preferred alternative carrier, the handover requester may perform data exchange using another alternative carrier, and data exchange is not limited to the aforementioned embodiment.

That is, the handover requester and the handover selector may perform data exchange by using a supported alternative carrier by exchanging a handover message. Also, as an example, the aforementioned alternative carrier may be at least one of Wi-Fi Direct, NAN, NFC, BLE and WLAN Infrastructure as an interface, and is not limited to the aforementioned embodiment.

Figure 13:
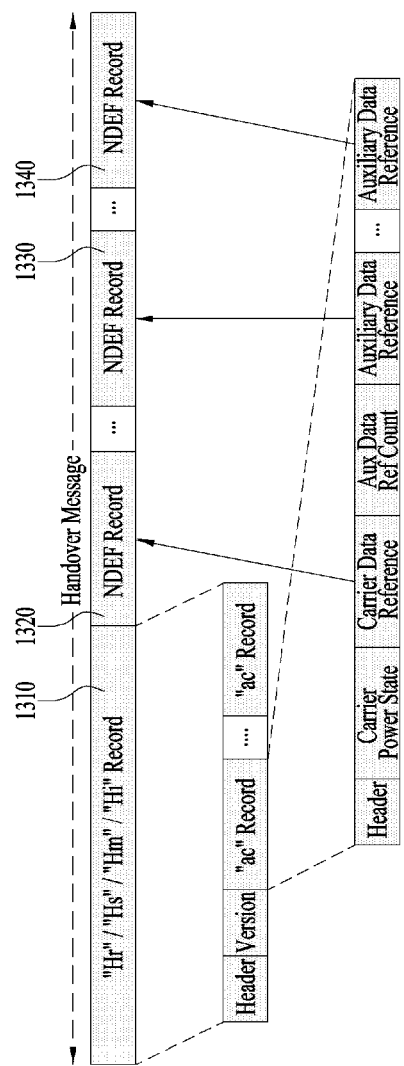
FIG. 13 is a diagram illustrating a message format of an NFC handover message in a device that supports NFC.

FIG. 13 is a diagram illustrating a message format of an NFC handover message in a device that supports NFC.

The handover message may include a handover record field 1310, and an NDEF (NFC Data Exchange Frame) record fields 1320, 1330 and 1340. At this time, 0 or more NDEF record fields may be configured. That is, the NDEF record field may not be included in the handover message or a plurality of NDEF record fields may be included in the handover message if necessary.

At this time, as an example, the handover record field 1310 may include any one of a handover request record, a handover select record, a handover mediate record, and a handover initiate record. That is, the message used for handover may be configured differently depending on each type.

Also, the handover record field 1310 may include at least any one of a header field, a version field, and an alternative carrier field. At this time, as an example, 0 or more alternative carrier fields may be included in the handover record field 1310. That is, no alternative carrier field may be included in the supported alternative carrier, or a plurality of carrier fields may be included in the supported alternative carrier.

Also, as an example, the alternative carrier field may include at least any one or more of a header field, a carrier power state field, a carrier data reference field, and an auxiliary data reference field. At this time, as an example, 0 or more carrier data reference fields may be included in the alternative carrier field. That is, the carrier data reference field may not be included in the alternative carrier field or a plurality of carrier data reference fields may be included in the alternative carrier field if necessary.

At this time, the carrier reference field and the auxiliary data reference field may indicate the NDEF record field as pointers. For example, the NDEF record indicated by the carrier reference field may be any one of handover carrier record and carrier configuration record. That is, the carrier reference field may indicate NDEF record that includes information on carrier.

Also, the auxiliary data reference may be a pointer that indicates NDEF record that includes information on auxiliary data. At this time, as an example, the NDEF record indicated by the auxiliary data reference field may be any one of auxiliary data record and verb record. That is, the auxiliary data reference may indicate the NDEF record that includes auxiliary information on carrier.

That is, the device which supports NFC as described above may exchange the handover message on the basis of NFC. As a result, the device may perform the aforementioned service discovery.

Hereinafter, a method for service discovery using NFC when ASP session is formed based on P2P connection will be described based on the aforementioned description.

Figure 14:
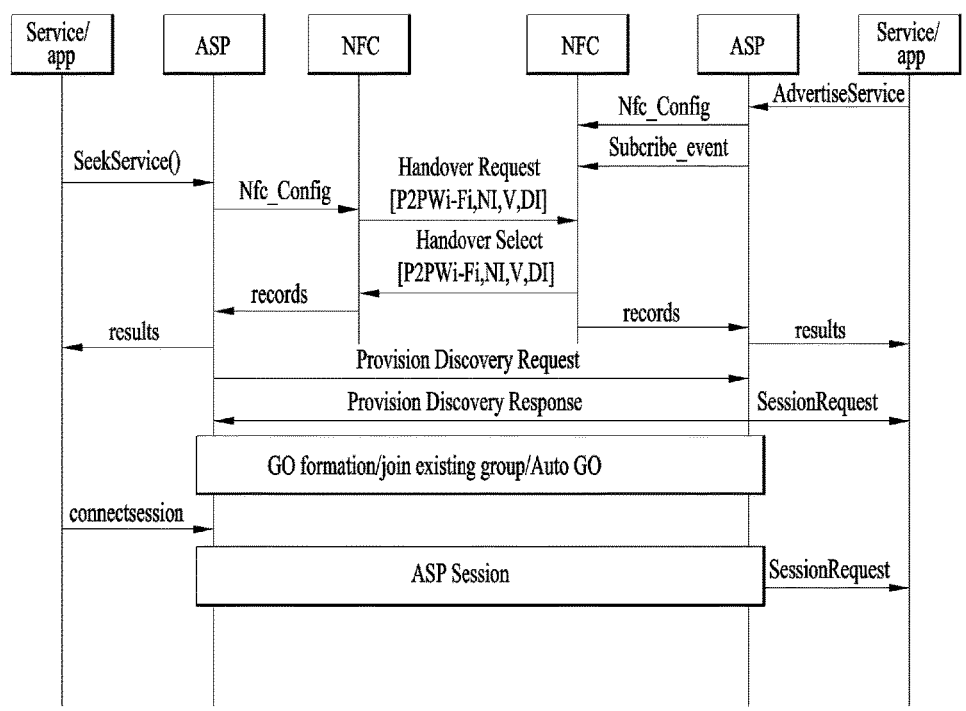
FIG. 14 is a diagram illustrating a method of performing service discovery by using NFC.

FIG. 14 is a diagram illustrating a method of performing service discovery by using NFC.

Referring to FIG. 14, a seeker device (or handover requester) may provide SeekService) method to the APS to perform service discovery through NFC. At this time, as an example, the seeker device may include at least one or more service hashes. Afterwards, the ASP of the seeker device may configure NFC tag and transmit a handover request message to an advertise device (or handover selector). At this time, as an example, the handover request message may be transmitted per request of the seeker device. That is, the handover request message may be performed independently for each request or service.

At this time, as an example, if two devices form ASP session on the basis of P2P connection, the handover request message may include at least one or more of Wi-Fi P2P carrier configuration record, network identity record, verb record, and device information record.

Also, as an example, the handover request message may include record information on different alternative carriers, and is not limited to the aforementioned embodiment.

At this time, as an example, attribute information include in the Wi-Fi P2P carrier configuration record may be listed in Table 1 below.

TABLE 1

| ID | Name | Description |
| --- | --- | --- |
| 0x 30 (TBD) | P2P_Version | Describe the level of the P2P. the Value is set to major version and minor version. [Major Version][Minor Version] to indicate the level of the P2P implementation. ASP2 shall can define the additional version to in dicate ASP2 defined P2P version. |
| 0x27 | Feature Capability | Describes the ASP Feature capability information. |
| 0x23 | Connection capability info | Describe the connection preference. |
| 0x28 | Persistent group info | Described the persistent group information. |

That is, the Wi-Fi P2P carrier configuration record may include at least any one or more of a P2P version attribute field, a feature capability attribute field, a connection capability information field, and an information field on persistent P2P group.

At this time, the P2P version field may be set to "0x02" or "0x00". That is, the P2P version field may be set to a value indicating Major Version or Minor Version as information on P2P version. At this time, the Minor Version may be a version which considers backward compatibility with a previous system.

Also, as an example, the P2P version field may be set to a new P2P version value as ASP that supports another interface, as described above, and is not limited to the aforementioned embodiment.

Also, the feature capability field may be a field which includes information required to exchange information on ASP transmission capability parameters. Also, the connection capability information field may include information related to configuration of Auto GO (Group Owner) or PersistentGO. Also, the persistent P2P group field may include information on persistent P2P group. That is, The Wi-Fi P2P carrier configuration record may include information on Wi-Fi P2P in which ASP session formation is performed based on P2P connection. In more detail, if the two devices intend to start new connection required by service session, the handover request message may include Wi-Fi P2P carrier configuration record.

Also, the handover request message may include verb record as the aforementioned auxiliary record. At this time, as an example, the verb record may be information included in the handover request message on the basis of TLV (Type, Length, Value) type. Table 2 may be an example of information included in the verb record for the handover request message.

TABLE 2

Verb ID
Verb Type
No Of Service TLVs
Type
Length
Service_hash
Advertisement_id
Session_info Also, as an example, the services for the handover request message may be identified by service hash, and are limited to the aforementioned embodiment.

Also, the handover request message may include device information record as the auxiliary record.

Also, the handover request message may include network identity record as the auxiliary record. At this time, as an example, if there is neither P2P structure known to the ASP nor connectable carrier, the network identity record may not be included in the handover request message, and the handover request message is not limited to the aforementioned embodiment.

At this time, as an example, the network identity record (Ni) may include information on a network address for identifying a network interface connected as a specific carrier. At this time, as an example, network identifiers may use corresponding seek protocols to acquire the current network address corresponding to the identifiers. For example, identification attribute may be include in the network identity record in the form of TLV. Also, identification attribute may be as listed in Table 3 below.

For example, if attribute name is IPv4 Attribute and handover request type is "Hr", the identification attribute may indicate an address of the handover requester. Also, as an example, in case of a GO device, the identification attribute may indicate IP address of the Go device.

Also, as an example, if attribute name is IPv4 Attribute and handover request type is "Hs", the identification attribute may indicate an address of the handover selector. Also, as an example, in case of the GO device, the identification attribute may indicate IP address of the Go device.

Also, as an example, if attribute name is IPv6 and handover request type is "Hr/Hs", the identification attribute may indicate an address of each device.

TABLE 3

| Attribute name | Handover Request type | Description |
| --- | --- | --- |
| IPv4 Attribute | Hr | Indicate the IP address of the Handover request. This may be included in case of initiating in the persistent. In case of the GO device this will be a GO IP address |
| IPv4 Attribute | Hs | Indicate the IP address of the Handover selector device. In case of the GO device this will be a GO IP address. |
| IPv6 | Hr/Hs | IP address of the device. |

Also, as an example, identification attribute may be defined as listed in Table 4 below. At this time, as an example, if attribute name is Target_IPv4_address and handover request type is "Hr/Hs", the identification attribute may indicate IP address of a target device. Also, as an example, this may be applied to a case that the handover requester is Go in the persistent P2P group. Also, as an example, if the handover selector is GO and IP address is allocated for the handover requester, the identification attribute may be included in the handover selection message.

Also, as an example, if attribute name is Target_IPv6_address and handover request type is "Hr/Hs", the identification attribute may indicate IP address of a target device. At this time, as an example, the identification attribute may be applied to a case that static IP address is assigned to the target device.

Also, as an example, this identification attribute may be applied to a case that the handover requester is Go in the persistent P2P group. Also, as an example, if the handover selector is GO and IP address is allocated for the handover requester, the identification attribute may be included in the handover selection message.

Also, as an example, if attribute name is Service_nework_information and handover request type is "Hr/Hs", the identification attribute may be defined when specific information on service is further required.

TABLE 4

| Attribute name | Handover Request type | Description |
| --- | --- | --- |
| Traget_IPv4_address | Hr/Hs | Indicate the IP address of the target device.<br>This is to assign the IP address for the target device.<br>This will be applicable for the persistent group and requestor device is a GO of that group.<br>The Handover Select message include this message in case the Handover Select message is a GO, and assigns the IP for the Handover requestor device. |
| Target_IPv6_address | Hr/Hs | Indicate the IP address of the target device.<br>This is to assign the static IP address for the target device.<br>This will be applicable for the persistent group and requestor device is a GO of that group.<br>The Handover Select message include this message in case the Handover Select message is a GO, and assigns the IP for the Handover requestor device. |
| Service_network_information | Hr/Hs | Addition service specific information required as per the service. |

At this time, as an example, Table 5 may be a structure of attribute information in the case that attribute name is Target_IPv4_address. Also, Table 6 may be a structure of attribute information in the case that attribute name is Target_Pv6_address. Also, Table 7 may be a structure of attribute information in the case that attribute name is Service_network_information.

TABLE 5

| Length | Value | Description |
| --- | --- | --- |
| 1 | 0x09 (TBD) | Attribute type: Target_IPv4_address |
| 1 | 0x04 | Attribute length 4 octet |
| 4 | IP address | IP Address |

TABLE 6

| Length | Value | Description |
| --- | --- | --- |
| 1 | 0x0A (TBD) | Attribute type: Target_IPv6_address |
| 1 | 0x10 | Attribute length |
| 16 | IPv6 address | IPv6 address |

TABLE 7

| Length | Value | Description |
| --- | --- | --- |
| 1 | 0x0B (TBD) | Attribute type: service information |
| 1 | 0-255 | Attribute length |
| 16 | Service specific information | Service defined information |

After the seek device transmits the handover request message to the advertiser device, the advertiser device may transmit the handover selection message to the seeker device. That is, the seeker device may be the aforementioned handover requester, and the advertiser device may be the aforementioned handover selector.

At this time, as an example, the advertiser device may also provide AdvertiseService( )method to the APS to perform service discovery through NFC, configure NFC tag and receive the handover request message in a state that subscribe event is configured. At this time, as an example, the handover selection message may include at least one or more of Wi-Fi P2P carrier configuration record, network identity record, verb record, and device information record. At this time, as an example, information on each record may be applied equally to Table 1 to Table 7 above.

Afterwards, NFC Of each of the seeker device and the advertiser device may provide information based on message reception to the ASP. Then, the ASP of each of the seeker device and the advertiser device may provide SearchResult event to each device on the basis of the information received from the NCF. Afterwards, the seeker device and the advertiser device may perform session connection after exchanging provision discovery request/response frames.

Figure 15:
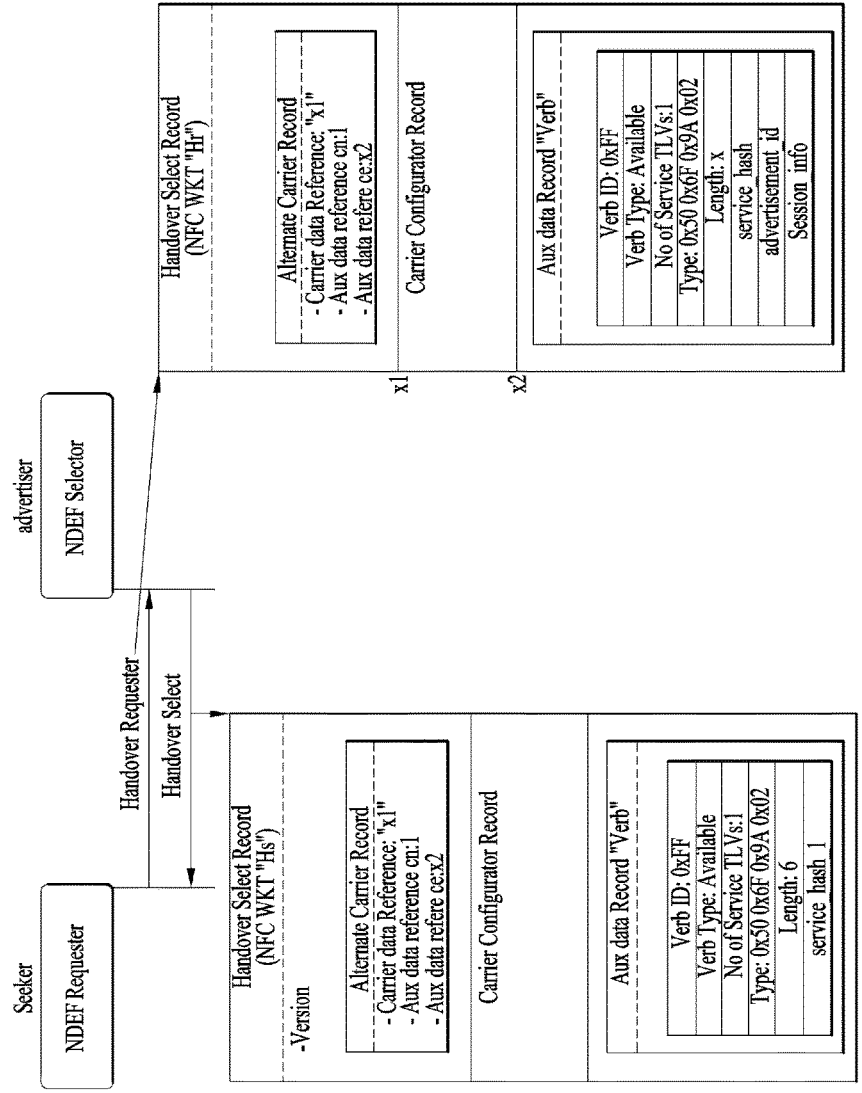
FIG. 15 is a diagram illustrating a handover request message and a handover selection message.

FIG. 15 is a diagram illustrating a handover request message and a handover selection message.

As described above, the handover requester (or seeker device) and the handover selector (or advertiser device) may perform service discovery through NFC. At this time, as an example, the two devices may use NFC to trigger Wi-Fi P2P connection. At this time, the handover requester may transmit the handover request message, which includes at least any one of P2P Wi-Fi Direct carrier configuration record and verb record to the handover selector. At this time, the value included in the verb record may be set as listed in Table 8 on the basis of Table 2.

TABLE 8

Verb ID: 0xFF(for vendor specific verb definition)
Verb Type: Available
No Of Service TLVs: 1
Type: OUI of Wi-Fi Alliance
Length: X
Service_hash
Advertisement_id(Opitonal)
Session_info (service specific session information) (ex, 1 byte session identifier Also, the handover selector may transmit the handover selection message to the handover requester after receiving the handover request message. At this time, as an example, the handover selection message may include P2P Wi-Fi Direct carrier configuration record as the selected alternative carrier record. Also, if service is supported, verb record on available information may be included in the handover selection message.

That is, as an example, the handover request message may include information on a plurality of alternative carriers, and if the handover selector selects P2P connection, the handover selector may transmit the handover selection message, which includes at least any one of the Wi-Fi P2P carrier configuration record and the verb record, to the handover requester. At this time, as an example, the value included in the verb record may be set as listed in Table 9 below on the basis of the value included in the verb record.

TABLE 9

Verb ID: 0xFF(for vendor specific verb definition)
Verb Type: Available
No Of Service TLVs: 1
Type: OUI of Wi-Fi Alliance
Length: X
Service_hash
Advertisement_id The handover requester and the handover selector may perform service discovery by using NFC through the aforementioned procedure.

At this time, in the aforementioned procedure, service discovery has been performed using the handover request/section messages of NFC. In respect of P2P connection, service discovery has been conventionally performed through exchange of probe request/response frames and service discovery request/response frames on the basis of method of the ASP. At this time, information included in the handover request/selection messages of NFC may be different from information included in the probe request/response frames and the service discovery request/response frames.

For example, the information included in the probe request/response frames and the service discovery request/response frames may not be included in the handover request/selection messages (or frames). At this time, even though the two devices have performed service discovery using NFC, the two device may fail in establishing P2P connection or forming ASP session due to lack of information. That is, P2P connection or ASP session formation may not be performed on the basis of difference of information. Also, as an example, after service discovery is performed using NFC, NFC may report the result of service discovery to the ASP. At this time, the ASP may notify the user of discovery information through SearchResult( ) event as described above. At this time, since discovery has been performed through NFC, information required for P2P connection or ASP session formation may not be normally delivered to the user.

At this time, at least any one or more of service status, service name and ASP CP (ASP Coordination Protocol Version) may be included in the handover selection message, whereby the aforementioned problem may be solved. That is, the handover requester may acquire information required for P2P connection and ASP session formation through the handover selection message.

In more detail, if the handover selector receives the handover request message from the handover requester, the handover requester may determine whether to support P2P Wi-Fi Direct. At this time, if the handover selector supports P2P Wi-Fi Direct, the handover selector may transmit the handover selection message, which includes at least any one of service status, service name and ASP CP version information, to the handover requester. As a result, the handover selector and the handover requester may acquire information required for P2P connection and ASP session formation, whereby P2P connection and ASP session formation may be performed more actively.

At this time, as an example, the service status may be information indicating whether the advertiser device (or handover selector) may accept new connection for a service requested by the seeker device (or handover requester). At this time, as an example, the service status may be set to any one of "available", "non-available" or "vender-specific". That is, the service status may be set to any one of an available status, a non-available status, and a specific service available status. As a result, the handover requester may know new P2P connection and ASP session formation for service with the handover selector.

Also, as an example, service name is a name for a service of the advertiser device (or handover selector) and may be information indicating a type of the service.

Also, as an example, the ASP CP (ASP Coordination Protocol) may be a protocol used by two devices to maintain ASP session and for communication between the two devices. At this time, version information on one ASP CP may be information indicating version of the ASP CP currently used by the two devices. As an example, the ASP CP version may be changed for a reason of extension of the ASP CP, and may be configured differently on the basis of the service supported through the ASP CP. Therefore, the two devices for forming P2P connection and ASP session need to share ASP CP version information.

That is, the service status, the service name and the ASP CP version information may be information required by the two devices for P2P connection and session formation. At this time, as an example, if the two devices perform service discovery by using NFC, since the two devices may not exchange the probe request/response frames or service discovery request/response frames, it may be difficult to share the aforementioned information. Therefore, the handover selector may acquire information required for P2P connection and ASP session formation by transmitting the handover selection message, which includes service status, service name and ASP CP version information, to the handover requester.

At this time, as an example, at least one or more of the aforementioned service status, service name and ASP CP version information may be included in the verb record of the handover selection message. That is, the verb record of the handover selection message may be configured as listed in Table 10 on the basis of Table 9.

TABLE 10

Verb ID: 0xFF(for vendor specific verb definition)
Verb Type: Available
No Of Service TLVs: 1
Type: OUI of Wi-Fi Alliance
Length: X
Service_hash
Advertisement_id
Service Name
Service status: available or non-available or vender-specific
ASP CP Version As another example, information on the aforementioned ASP CP version may be included in the Wi-Fi P2P carrier configuration record and then transmitted. That is, a field for the ASP CP version may be added to Table 1, and this may be listed in Table 11 below. That is, since the ASP CP version information may be information on P2P connection and session formation, the ASP CP version information may be included in the Wi-Fi P2P carrier configuration record. At this time, as an example, information on the aforementioned service status and service name may further be included in the verb record, and is not limited to the aforementioned embodiment.

Also, as an example, the ASP CP version information may be included in the Wi-Fi P2P carrier configuration record, and the information on service status and service name may be included in the verb record and is not limited to the aforementioned embodiment.

TABLE 11

| ID | Name | Description |
|---|---|---|
| 0x 31 (TBD) | ASP_CP_Version | ASP CP version information (information to be newly added) |
| 0x 30 (TBD) | P2P_Version | Describe the level of the P2P. the Value is set to major version and minor version [Major Version][Minor Version] to indicate the level of the P2P implementation. ASP2 shall can define the additional version to indicate ASP2 defined P2P version |
| 0x27 | Feature Capability | Describes the ASP Feature capability information |
| 0x23 | Connection capability info | Describe the connection preference |
| 0x28 | Persistent group info | Described the persistent group information |

Also, as an example, Advertised Service Info Attribute for the advertiser device may be included in the Wi-Fi P2P carrier configuration record as the information on service name. In more detail, list information for each service, which may be supported by the advertiser device (or handover selector), may be included in the Wi-Fi P2P carrier configuration record. That is, the advertiser device is a service name, and may transmit the list information for service that may be supported to the seeker device by including the list information in the Wi-Fi P2P carrier configuration record of the handover selection message.

Also, as an example, if persistent group info is included in the Wi-Fi P2P carrier configuration record, the advertiser device (or handover selector) may have credential information of the corresponding group and share the aforementioned information with the seeker device (or handover requester). At this time, as an example, the aforementioned information may be added to the verb record as a parameter. Also, as an example, the aforementioned information may be added to the Wi-Fi P2P carrier configuration record as credential information on persistent group, and is not limited to the aforementioned embodiment.

That is, if the two devices perform service discovery by using NFC, information required for P2P connection and ASP session formation may be included in the handover selection message and is not limited to the aforementioned embodiment.

Figure 16:
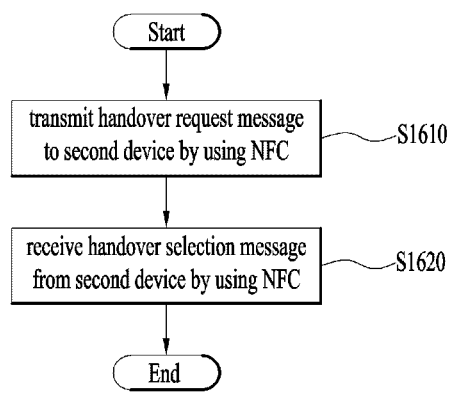
FIG. 16 is a flow chart illustrating a method for performing service discovery.

FIG. 16 is a flow chart illustrating a method for performing discovery by means of a device in accordance with one embodiment of the present invention.

A first device may transmit a handover request message to a second device by using NFC (S1610). At this time, as described with reference to FIGS. 11 to 15, the first device may be a handover requester or seeker device. Also, the second device may be a handover selector or advertiser device. At this time, as an example, the handover request message may include a record for 0 or a plurality of alternative carriers. At this time, as described above, the handover request message may include information on an alternative carrier supported by the first device. Also, if ASP session is formed through P2P connection as an example, the handover request message may include at least one or more of P2P Wi-Fi carrier configuration record, network identification record, verb record and device information record, as described above. Also, as an example, the handover request message may be a message for performing service discovery of a specific service for the first device. That is, the handover request message independent per service may be transmitted, and is not limited to the aforementioned embodiment.

Next, the first device may receive a handover selection message from the second device by using NFC (S1620). At this time, as described with reference to FIGS. 11 to 15, the handover selection message may include at least one or more of service status, service name and ASP CP version information. Also, as an example, the handover selection message may also include at least one or more of P2P Wi-Fi carrier configuration record, network identification record, verb record and device information record, as described above.

At this time, as an example, the service status, the service name and the ASP CP version information may be transmitted by being included in the verb record of the handover selection message. As another example, the ASP CP version information may be transmitted by being included in the P2P Wi-Fi carrier configuration message of the handover selection message. Also, as an example, the handover selection message may be a message for performing service discovery of a specific service for the first device. That is, the handover selection message independent per service may be transmitted, and is not limited to the aforementioned embodiment.

At this time, if the first device receives the handover selection message from the second device, the first device may complete service discovery for the first service. Afterwards, the first device may establish P2P connection with the second device and form ASP session, as described above.

Figure 17:
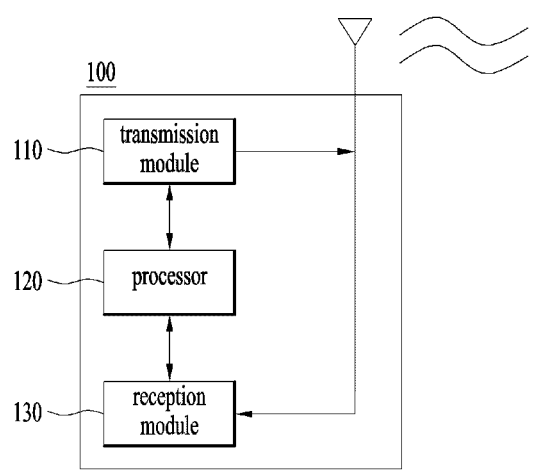
FIG. 17 is a block diagram illustrating a user equipment (UE) in accordance with the present specification.

FIG. 17 is a block diagram illustrating a user equipment (UE) in accordance with the present specification.

The UE may be a device that may perform service discovery. At this time, the UE 100 may include a transmission module 110 for transmitting a radio signal, a reception module 130 for receiving a radio signal, and a processor 120 for controlling the transmission module 110 and the reception module 130. At this time, the UE 100 may perform communication with an external device by using the transmission module 110 and the reception module 130. As an example, the external device may be another UE. As another example, the external device may be a base station. That is, the external device may be a device that may perform communication with the UE 100, and is not limited to the aforementioned embodiment. The UE 100 may transmit and receive digital data such as contents by using the transmission module 110 and the reception module 130.

According to one embodiment of the present specification, the processor 120 of the UE 100 may transmit a handover request message to a second device by using NFC. Also, the processor 120 of the UE 100 may receive a handover selection message from the second device by using NFC. At this time, the handover selection message may include information on P2P connection and ASP session formation. Also, the information on P2P connection and ASP session formation, which is included in the handover selection message, may include at least any one or more of service status, service name and ASP CP version information, as described above.

The embodiments of the present invention may be implemented by various means, for example, hardware, firmware, software, or their combination.

In case of implementation based on hardware, the method according to the embodiments of the present invention may be implemented by one or more of application specific integrated circuits (ASICs), digital signal processors (DSPs), digital signal processing devices (DSPDs), programmable logic devices (PLDs), field programmable gate arrays (FPGAs), processor, controller, microcontroller, microprocessor, etc.

In case of implementation based on firmware or software, the method according to the embodiments of the present invention may be implemented in the form of module, procedure or function, which performs the above-described functions or operations. A software code may be stored in a memory unit and then driven by the processor. The memory unit is arranged inside or outside the processor, and may transmit and receive data to and from the processor by various means which are already known.

The detailed description of the preferred embodiments of the present invention is given to enable those skilled in the art to realize and implement the present invention. While the present invention has been described referring to the preferred embodiments of the present invention, those skilled in the art will appreciate that many modifications and changes can be made to the present invention without departing from the spirit and essential characteristics of the present invention. The above embodiments are therefore to be construed in all aspects as illustrative and not restrictive. Therefore, the present invention intends not to limit the embodiments disclosed herein but to give a broadest range matching the principles and new features disclosed herein. It will be apparent to those skilled in the art that the present invention may be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

In this specification, both the product invention and the method invention have been described, and description of both inventions may be made complementally if necessary.

INDUSTRIAL APPLICABILITY

The aforementioned method for performing service discovery by means of a UE in a wireless communication system may be applied to various wireless communication systems.

The invention claimed is:
1. A method for performing service discovery by a first device in a wireless communication system, the method comprising:
   transmitting a handover request message to a second device based on near field communication (NFC); and
   receiving a handover selection message from the second device based on the NFC,
   wherein the handover selection message includes information on peer-to-peer (P2P) connection and application service platform (ASP) session formation, which includes a service status that informs whether new connections for requested services can be accepted,
   wherein the service status is set to one of an available status, a non-available status, or a vender-specific status,
   wherein the available status is used when the new connections for all of the requested services can be accepted,
   wherein the non-available status is used when the new connections for all of the requested services cannot be accepted, and
   wherein the vender-specific status is used when the new connections for some particular services of the requested services can be accepted.
2. The method according to claim 1,
   wherein the service discovery is performed per service, and
   wherein the handover request message and the handover selection message are messages for service discovery of a first service.
3. The method according to claim 2,
   wherein the service discovery of the first service is completed when the first device transmits the handover request message to the second device and receives the handover selection message from the second device.
4. The method according to claim 3, the method further comprising:
   performing the P2P connection and the ASP session formation based on the information on the P2P connection and the ASP session formation.
5. The method according to claim 1,
   wherein the information on the P2P connection and the ASP session formation is transmitted in a verb record of the handover selection message.
6. The method according to claim 1,
   wherein the handover selection message further includes list information for a service that may be supported by the second device.
7. The method according to claim 6,
   wherein the list information for the service that may be supported by the second device is included in a P2P Wi-Fi Carrier Configuration record of the handover selection message.
8. A first device for performing service discovery in a wireless communication system, the first device comprising:
   a receiver configured to receive information from an external device;
   a transmitter configured to transmit information from the external device; and
   a processor configured to:
      control the transmitter to transmit a handover request message to a second device based on near field communication (NFC), and
      control the receiver to receive a handover selection message from the second device based on the NFC,
   wherein the handover selection message includes information on peer-to-peer (P2P) connection and application service platform (ASP) session formation, which includes a service status that informs whether new connections for requested services can be accepted,
   wherein the service status is set to one of an available status, a non-available status, or a vender-specific status, wherein the available status is used when the new connections for all of the requested services can be accepted, wherein the non-available status is used when the new connections for all of the requested services cannot be accepted, and wherein the vender-specific status is used when the new connections for some particular services of the requested services can be accepted.

9. The first device according to claim 8, wherein the service discovery is performed per service, and wherein the handover request message and the handover selection message are messages for service discovery of a first service.

10. The first device according to claim 9, wherein the service discovery of the first service is completed when the first device transmits the handover request message to the second device and receives the handover selection message from the second device.

11. The first device according to claim 10, wherein the processor is further configured to:

perform the P2P connection and the ASP session formation based on the information on the P2P connection and the ASP session formation.

* * * * *